(12) United States Patent
Baumgarte et al.

(10) Patent No.: US 12,115,714 B2
(45) Date of Patent: Oct. 15, 2024

(54) GRIPPER FOR HOLDING WORKPIECES, IN PARTICULAR PREFORMS OR CONTAINERS

(71) Applicant: KHS GmbH, Dortmund (DE)

(72) Inventors: Rolf Baumgarte, Ahrensburg (DE); Dieter Klatt, Hamburg (DE); Frank Lewin, Tangstedt (DE); Michael Linke, Hamburg (DE); Jan Fabian Meyer, Hamburg (DE); Dirk Schumacher, Hamburg (DE)

(73) Assignee: KHS GmbH, Dortmund (DE)

( * ) Notice: Subject to any disclaimer, the term of this patent is extended or adjusted under 35 U.S.C. 154(b) by 811 days.

(21) Appl. No.: 17/284,913

(22) PCT Filed: Oct. 11, 2019

(86) PCT No.: PCT/EP2019/077565
§ 371 (c)(1),
(2) Date: Apr. 13, 2021

(87) PCT Pub. No.: WO2020/083663
PCT Pub. Date: Apr. 30, 2020

(65) Prior Publication Data
US 2021/0379812 A1  Dec. 9, 2021

(30) Foreign Application Priority Data

Oct. 26, 2018  (DE) .......................... 102018126797.5

(51) Int. Cl.
*B29C 49/42* (2006.01)
*B29L 31/00* (2006.01)

(52) U.S. Cl.
CPC .... *B29C 49/4205* (2013.01); *B29C 49/42075* (2022.05); *B29L 2031/7158* (2013.01)

(58) Field of Classification Search
CPC .......... B29C 49/4205; B29C 49/42075; B29C 49/42087; B65G 47/847; B65G 2201/0244; B65G 2201/0247; B67C 3/242

See application file for complete search history.

(56) References Cited

U.S. PATENT DOCUMENTS

| 8,556,317 B2 * | 10/2013 | Bodtlander | ............ | B65G 47/90 |
| | | | | 901/49 |
| 8,833,824 B2 * | 9/2014 | Fahldieck | ............ | B65G 47/847 |
| | | | | 198/470.1 |

(Continued)

FOREIGN PATENT DOCUMENTS

| DE | 10217898 A1 | 11/2003 |
| DE | 102009051656 A1 | 5/2011 |

(Continued)

OTHER PUBLICATIONS

International Search Report dated Jan. 23, 2020 filed in PCT/EP2019/077565.

*Primary Examiner* — Dean J Kramer
(74) *Attorney, Agent, or Firm* — Rankin, Hill & Clark LLP (57) ABSTRACT

A gripper for holding preforms or containers in their neck region having two pivotable gripper arms held in a base position under spring tension such that their gripping ends jointly enclose and hold the neck region. They are pivotable out of the base position jointly in one direction if they come into contact with an obstacle. In the base position, a main gripper arm is clamped via a spring with the gripper base, which pulls the main arm into contact with the other secondary gripper arm. The main and secondary arms are each mounted in a respective joint. The joint of the secondary arm is closer to its gripping end than the joint of the main arm is to its gripping end. The arms press against one (Continued)

another in the closed position at least in two regions, one above the joint of the secondary arm and the other below it.

6 Claims, 5 Drawing Sheets

(56) References Cited

U.S. PATENT DOCUMENTS

2003/0197391 A1  10/2003  Graffin
2012/0223468 A1   9/2012  Baumgarte et al.
2014/0291909 A1  10/2014  Linke et al.

FOREIGN PATENT DOCUMENTS

DE      102016001755 A1    8/2017
WO      WO-2011015371 A1 *  2/2011  ........... B65G 47/847

* cited by examiner

GRIPPER FOR HOLDING WORKPIECES, IN PARTICULAR PREFORMS OR CONTAINERS

BACKGROUND OF INVENTION

Field of Invention

The invention relates to a gripper for holding a neck region of a preform or a container as well as a transfer wheel for a container processing machine.

Brief Description of Related Art

Generic grippers are used in particular in container processing machines, for example stretch blow molding machines for blow molding of containers in which containers are molded from preforms and then filled, for example, or machines for simultaneous molding and filling (molding and filling machines). In such machines, so-called preforms are first thermally conditioned and then in a subsequent step expanded into finished containers either using compressed gas, for example compressed air, or liquid filling material. Between the different treatment stations, transfer wheels are usually provided, using which the preforms are transferred from one station, for example a heating line, to the next station, for example the forming device. The rotating transfer wheels carry several grippers pointing outwards with their gripping devices, which can grip and hold the preforms in their neck region and release them again at the next treatment station. In most cases, the grippers are arranged movably in relation to the transfer wheel, for example having telescopic arms, which allow the gripper to be pushed forward or back, and are brought to the desired position via a cam control. The grippers are guided using cam rollers past stationary curves for this purpose.

It is understood that the grippers can of course not only be used for gripping preforms in their neck region, but also for gripping finished containers. This is because preforms and containers are usually formed identically in this gripping region, or in other words: the gripping region of the preform is not changed during the forming process.

As a rule, the grippers have a gripper base, on which two gripper arms are arranged pivotably in relation to one another. Both grippers each carry at their outward-pointing end a gripping element for partially enclosing the neck region of a preform (or a container) and are held under spring tension in a base position, i.e., a position in which the gripper arms press against one another and their gripping ends can jointly grip and hold the neck region of a preform.

An active and a passive variant can be distinguished in the case of the grippers.

In the active variant, the gripper arms are actively opened by means of an actuator to grip a preform or a container. This can be for example a cam roller engaging on one of the gripper arms, which in turn is moved by a static curve in a transfer wheel to open the gripper arm.

In the passive variant, the neck regions of the preforms or containers are pressed into the gripping devices held against each other under spring tension in the base position. The gripping ends can be formed or equipped at their free ends in such a way that pushing in the preforms or containers is facilitated (for example by rollers, etc.).

One problem with the use of grippers on transfer wheels etc. is that mechanical faults etc. can occur, in particular at the desired high throughput speeds, and as a result, collisions of the gripper with other parts of the station or foreign bodies. In order to minimize mechanical damage to the system in the case of such collisions, it is provided in generic grippers that their gripper arms can be deflected jointly against the rotational direction of the transfer wheels, or against the movement direction of other transfer devices, and thus can evade in the event of a collision.

A gripping device for closure caps for containers is known from DE 102 17 898 A1.

In a gripper known from DE 10 2009 051 656 A1, the gripper base is pivotably mounted on a base element and can perform the desired evasive movement as a whole with the gripper arms. Laterally on the lateral surfaces of the gripper base, counter-elements held under spring tension are provided for this purpose, which under normal conditions hold the gripper base in a desired operating position and fold open in case of a collision and release the gripper base. One problem with the known gripper is that it is relatively complexly designed and has a high weight, which can result in problems in particular with rapidly rotating transfer wheels.

The object of the invention is to provide a gripper which has the above-described properties and due to its simple construction has a significantly lower weight compared to known grippers.

BRIEF SUMMARY OF THE INVENTION

The object is achieved by a gripper wherein one of the gripper arms as the main arm is clamped via a spring with the gripper base, which pulls the main arm into contact with the other gripper arm, functioning as a secondary arm, in the base position, and the main and secondary arms are each mounted in a joint, wherein the joint of the secondary arm is closer to its gripping end than the joint of the main arm, and the main and secondary arm press against one another in the closed position at least in two regions, one of which is located above the joint of the secondary arm and the other below it on a lever of the secondary arm extending downward from the joint. A transfer wheel for a container processing machine, in particular a stretch blow molding machine or molding and filling machine, that has multiple grippers as disclosed herein received circumferentially on its outer circumference and having their gripping devices pointing outward also achieves this object.

As with grippers known from the prior art, the gripper according to the invention also has a gripper base, on which two gripper arms are pivotably mounted. The gripper arms are held under spring tension in a base position in which the gripper can hold a preform or a container in the neck region using gripping ends provided at the ends of the gripper arms.

According to the invention, it is provided that one of the two arms, hereinafter referred to as the main arm, is clamped via a spring with the gripper base. The spring is aligned so that it pulls the main arm into contact with the other arm, hereinafter referred to as the secondary arm, in such a way that both arms are held in the base position by the spring force.

Furthermore, it is provided that the main and secondary arm are each mounted in a joint on the gripper base, wherein the joints are offset vertically in the direction of the longitudinal axis of the gripper arms in such a way that the joint of the main arm is farther away from its gripping end than the joint of the secondary arm. In other words, with respect to their pivot points, the levers of the main and secondary arm bearing the gripping ends are of different lengths.

In the base position, the main and secondary arm press against one another in at least one point or region, which is located, seen from the gripping end, below the joint of the secondary arm, i.e., on the side facing away from the gripping end. The secondary arm has a lever that extends downward seen from the joint and with which the secondary arm presses against the main arm.

Preferably, both arms press against one another in a point below the joint of the secondary arm and a point above the joint of the side arm, for example in the region of the gripping ends.

The offset of the joints in the vertical direction, as provided in the gripper according to the invention, on the one hand, ensures that both arms are aligned under the effect of the spring in a defined manner in a base position, in which with inserted gripping ends, both arms are parallel and the secondary arm prevents further pivoting of the main arm in the direction of the spring force. On the other hand, both arms can be deflected jointly against the force of the spring in case of a collision. It is understood that the joint deflection of both arms can only take place in one direction. Therefore, it is necessary to arrange the gripper arms accordingly with regard to, for example, the movement direction of the transport or transfer wheel. Specifically, the secondary arm is, seen in the movement direction of the transport wheel, the front arm, i.e., the arm, which in case of collision first encounters an obstacle and then in its deflection movement also deflects the adjacent main arm against the force of the spring. If the gripper having the deflected arms has passed the region of the mechanical fault or collision, then the spring can pull both arms back into the base position.

The construction according to the invention is therefore very simple and manages using significantly fewer components than generic grippers. An essential component of the gripper according to the invention is that the main and secondary arm are each pivotably arranged in a separate joint, wherein the two joints are vertically offset in relation to one another as described above. The vertical distance of the joints in relation to one another allows both arms to be deflected in the desired manner in case of a collision. How large the distance has to be can be easily established by, for example, simulation of the desired gripper movements in typical drawing or design programs.

To specify the vertical distance of the joints, the offset angle defined in the following can be used. The offset angle is the angle between a first line through the joint of the main arm perpendicular to the longitudinal axis of the gripper arms in the base position and a connecting line between the joints extending upward from the first line.

Preferably, it is provided that the offset angle is at least half of the desired deflection angle.

As a rule, a deflection of both arms by at least approximately 45° in case of a collision, in relation to the main arm, is desired. To ensure such a deflection, i.e., the secondary arm can be pivoted together with the main arm without any problems, it is sufficient to arrange the joints having an offset angle of 22.5°. Of course, this angle can also be chosen to be larger, but it is essential that the offset angle is at least half of the desired deflection angle of the main arm. Whether the offset angle is ultimately chosen to be larger, however, is also dependent on spatial requirements, for example. For example, the spring usually extends between the joints and it has to be ensured that it has sufficient space when it changes its position when the main arm is pivoted or deflected.

The gripper of the invention has an array of advantages. As already mentioned, it can be solved structurally in a particularly simple way.

In the passive variant, the gripper requires only one spring, which clamps the main arm with the gripper base. Further couplings, for example between the main and secondary arms, are not required.

As already repeatedly stated, an essential aspect of the gripper according to the invention is that the joints are offset vertically in relation to one another. For the desired deflection of both arms, the vertical distance between the two joints can be easily established as stated above. As also mentioned above, however, it can additionally be desired that the vertical distance between the joints takes into account still further, for example, spatial requirements. Another essential point is, for example, the pressing force with which the secondary arm presses against the main arm in the point or region below its joint. This pressing force is inversely proportional to the distance between the joint of the secondary arm and the contact point or region. In other words, the greater this distance, the lower the pressing force and thus the wear, especially of the secondary arm in the region of the contact point. In this respect, it can also be advantageous for this reason to make the vertical offset between the joints slightly larger than required solely for the deflection of both arms.

As stated above, the gripper according to the invention can be provided in a passive and an active variant. In the active variant, in addition to the features already specified, an actuator would have to be provided that opens the arms for gripping a preform or a container. In the specific case, an actuator would be provided for this purpose in the gripper according to the invention, which pivots out the main arm. This could be in particular a cam roller, which is linked via a lever on the main arm and is moved by a corresponding static curve in, for example, the transfer wheel. It is problematic that the secondary arm no longer assumes a defined position as soon as the contact with the main arm is lifted. In order to counteract this problem, in the active variant, a coupling is therefore additionally provided between the main arm and secondary arm in a region below the joint of the secondary arm. This can be, for example, a spring that is tensioned between the main and secondary arm. Providing another form of the force coupling would also be conceivable and preferred, for example a magnetic coupling that pulls the secondary arm into the desired position.

The invention furthermore relates to a transfer wheel for a container processing machine, in particular a stretch blow molding machine, in which containers are molded from preforms and then filled, for example, or a machine for simultaneous molding and filling (molding and filling machine), which has multiple grippers as disclosed herein received circumferentially on its outer circumference and having their gripping devices pointing outward. Transfer wheels with grippers are known in principle from, for example, DE 102 17 898 A1.

Preferably, a control curve associated with the transfer wheel is provided for actuating a cam roller. Control curves for actuating grippers are known, for example, from DE 10 2009 051 656 A1.

BRIEF DESCRIPTION OF THE DRAWINGS

In the following, the invention is to be explained in more detail on the basis of several figures.

In the figures.

DETAILED DESCRIPTION OF THE INVENTION

Figure 1:
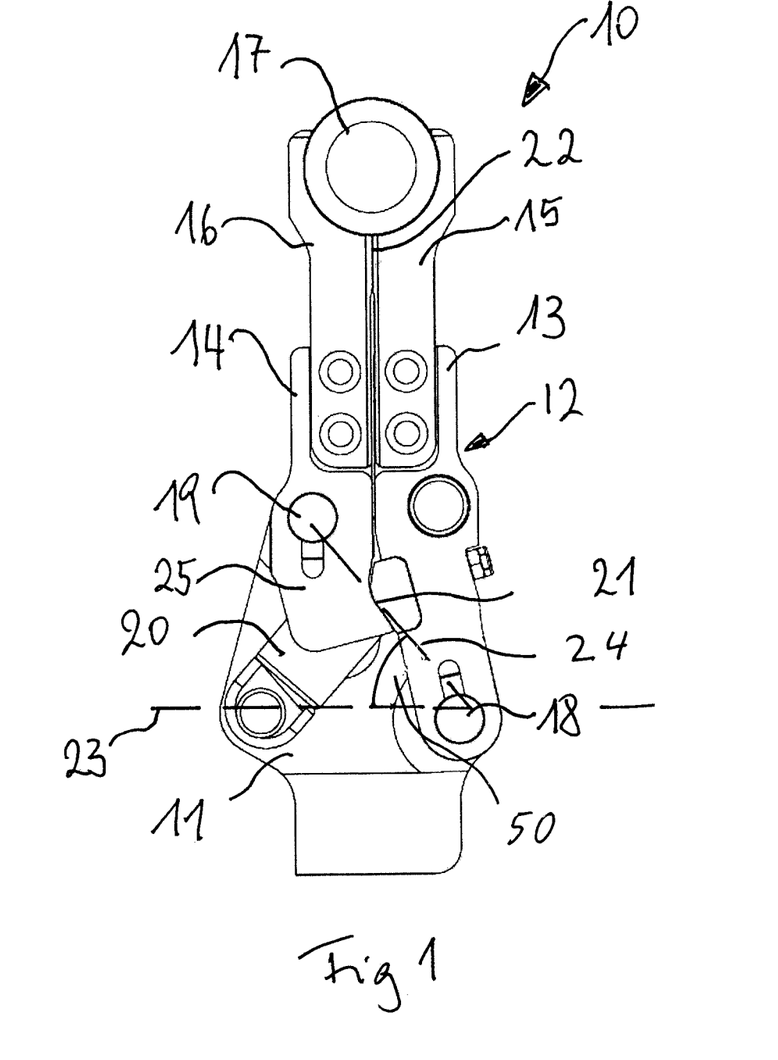
FIG. 1 shows a view from below of a passive embodiment of the gripper according to the invention.

FIG. 1 shows an exemplary embodiment of a gripper 10 having a gripper base 11 on which two gripper arms 12 are linked, of which one functions as a main arm 13 and the other as a secondary arm 14. At their free ends, the main and the secondary arm 13, 14 each have a gripping end 15, 16. Each of the gripping ends 15 and 16 is suitable for partially enclosing, for example, a preform 17 in its neck region. Together they enclose in the shown basic position of the arms 13 and 14 enough that it is held between the gripping ends.

The main arm 13 is mounted in a joint 18 and the secondary arm 14 in a joint 19 on the gripper base 11. The main arm 13 is furthermore connected to the gripper base 11 via a spring 20.

The spring 20 pulls the main arm 13 into the base position shown, in which it presses against the secondary arm 14 in two contact points 21 and 22.

It can also be seen that the joints 18 and 19 are arranged offset in relation to one another, i.e., the joint 19 of the secondary arm is not as far from its gripping end 16 than the joint 18 of the main arm from its gripping end 15. With respect to a line 23 which intersects the joint 18 transversely to the longitudinal axis of the gripper arms 13 and 14, the offset angle 50 of a connecting line 24 between the joints 18 and 19 with the first line 23 is approximately 45° in the example shown. However, this angle can certainly have different values. It is only important that in the case of a movement of the gripper shown here counterclockwise in case of a collision, the arms 13 and 14 can be deflected against the movement direction, i.e., to the right in the example, in order to evade the obstacle. The size of the offset angle 50 depends on the desired deflection angle and the geometry of the gripper arms. It may be easily ascertained, for example by simulation in a drawing program. As a rule, the angle 50 is between 10° and 45°, it should be at least half of the desired deflection angle of the main arm.

It is furthermore essential that the secondary arm 14 also has a lever region 25, with which the secondary arm can press against the main arm 13 in the region 21, on its end facing away from the gripping end 16 below the joint 19.

With regard to the mechanical load in particular of the secondary arm, it can play a role that the pressing force in the contact region 21 is dependent on the distance of the point 21 to the joint 19. The greater the distance, the less the pressing force and thus the wear of the secondary arm in the contact region 21. In this respect, it can be provided that the joint 19 is offset farther in the vertical direction with respect to the joint 18 than is actually necessary for the desired deflection of the gripper arms 13 and 14 in case of collision. Also spatial requirements, for example sufficient space for the movement of the spring 20, can play a role in determining the vertical offset of the joints.

Figure 2:
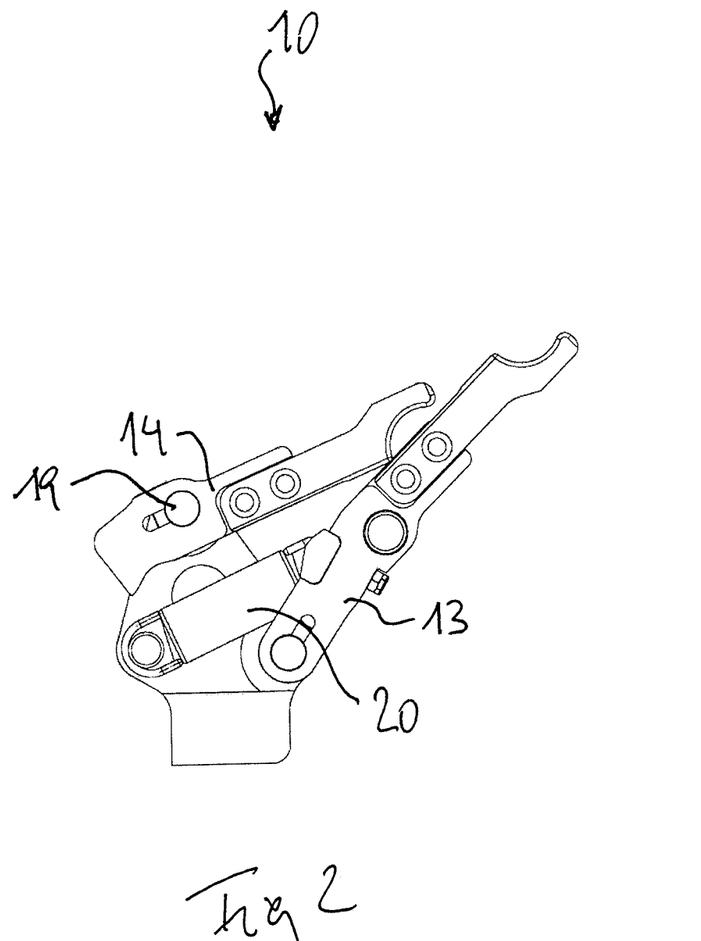
FIG. 2 shows the gripper from FIG. 1 in a deflected state.

The gripper from FIG. 1 is shown in FIG. 2, wherein the gripper arms 13 and 14 are deflected by an angle of 45° with respect to the main arm 13. It can also be seen that the secondary arm 14 presses against the main arm 13 with a relatively large amount of play. Solely with respect to deflection, it would be easily possible to offset the joint 19 of the secondary arm 14 less in the vertical direction. In the case shown, instead of the actual approximately 45°, approximately 23° would be sufficient so that both arms could pivot out in the desired angle range in case of collision. It can also be seen in this figure that the main arm 13 is deflected against the force of the spring 20 in case of collision. On the one hand, this makes the deflection somewhat more difficult, but on the other hand, it ensures that after passing the collision region, both arms automatically align themselves again in the desired base position.

Figure 3:
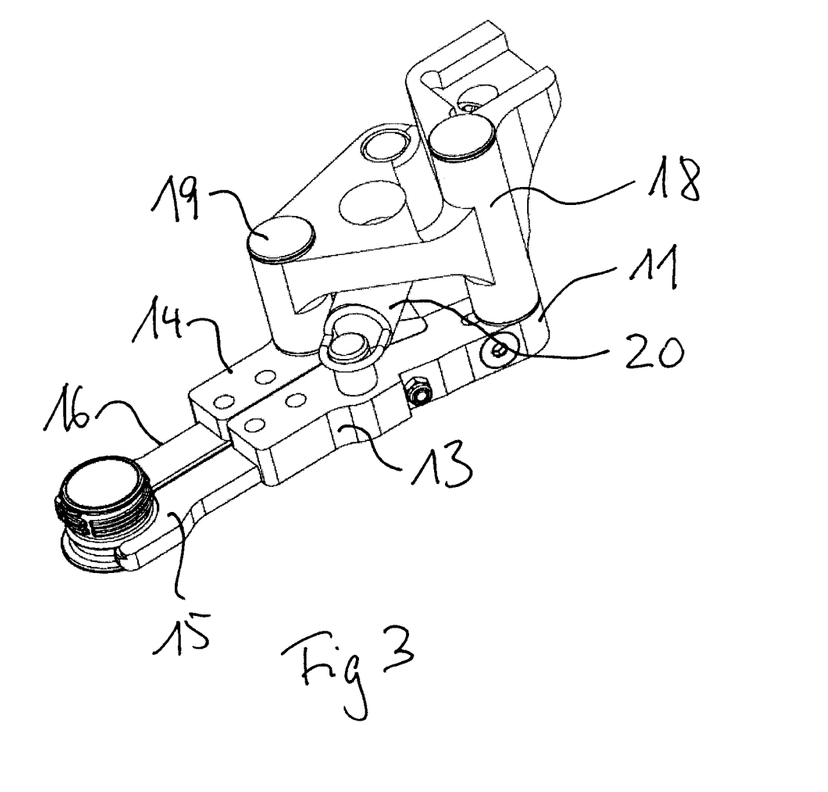
FIG. 3 shows a perspective view of the gripper from FIGS. 1 and 2.

FIG. 3 shows the gripper 10 from FIGS. 1 and 2 in a perspective illustration. Main arm 13 and secondary arm 14 are aligned in the base position. The main arm 13 is clamped with the spring 20, and is pivotably mounted in the joint 18. The secondary arm 14 is pivotably arranged in a joint 19 on the gripper base 11. Both arms 13 and 14 hold with their gripping ends 15 and 16 a preform (only schematically shown).

Figure 4:
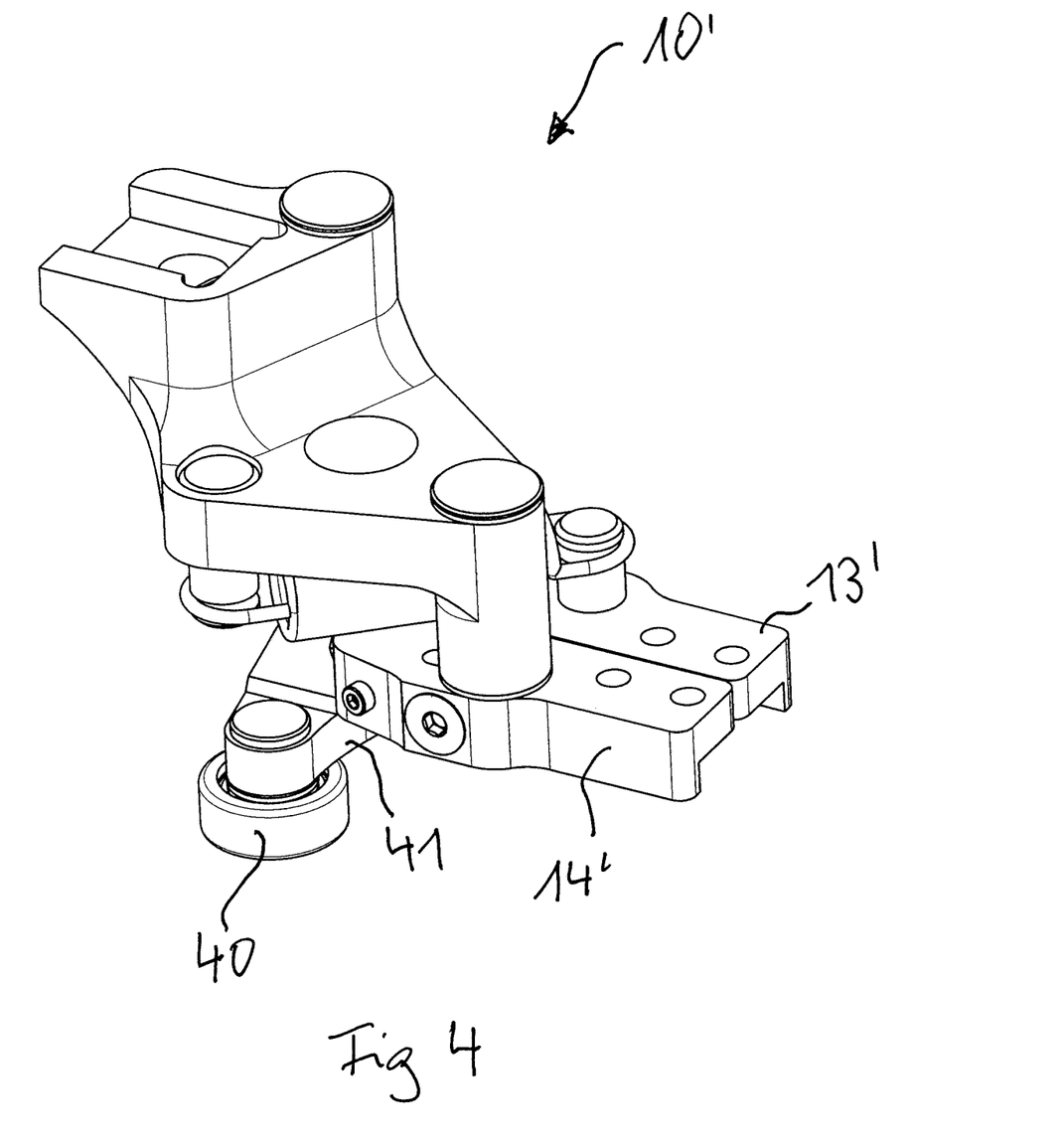
FIG. 4 shows a perspective view of an active embodiment of the gripper.
Figure 5:
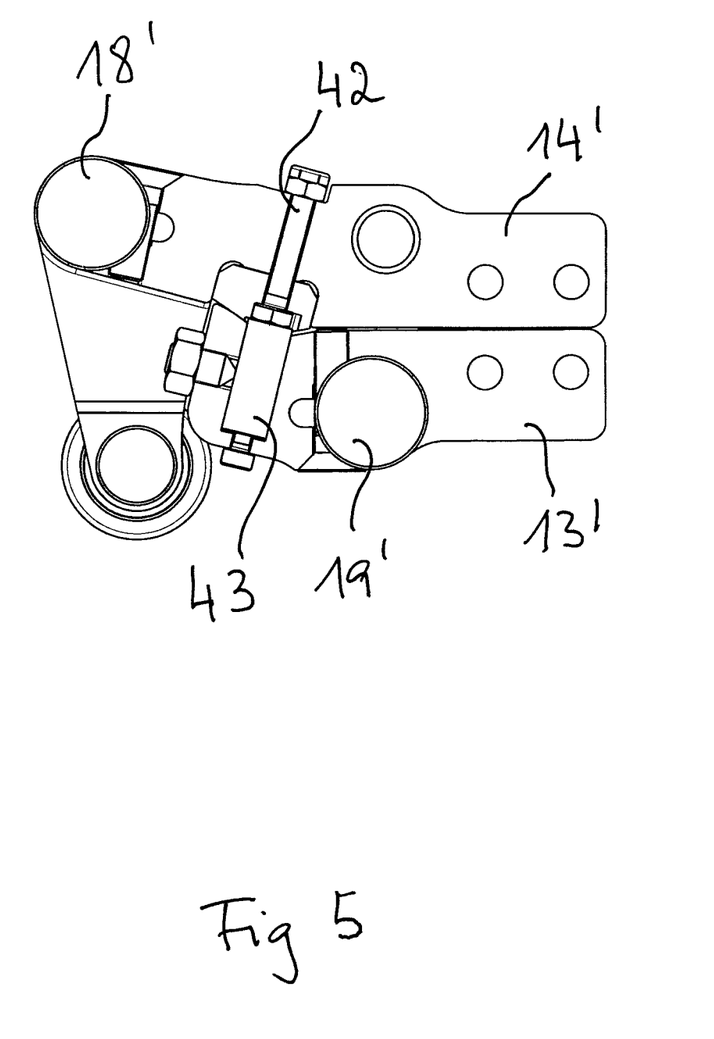
FIG. 5 shows a view from below of the gripper from FIG. 4.

FIG. 4 shows an active embodiment of a gripper according to the invention in a perspective view. This embodiment essentially corresponds to the embodiment shown in FIGS. 1-3. The same reference numerals with an apostrophe are therefore used for the same components and, in particular, only the differences are discussed. In addition to the gripper shown in FIGS. 1-3, the gripper 10' shown in FIG. 4 has a cam roller 40, which is connected to a main arm 13' via a lever 41. The cam roller 40 is pressed forward in operation via a control curve, for example in the transfer wheel and then opens the main arm 13'. However, as mentioned above, opening the main arm 13' has the result that the fixation of the secondary arm 14' predetermined by it is lifted. In other words, the secondary arm 14' can assume an undefined position. In order to avoid this, as can be seen in FIG. 5, a magnetic coupling 42, 43 is provided between the main arm 13' and the secondary arm 14' below the joint 19' of the secondary arm 14' which pulls the secondary arm 14' into the desired defined position upon pivoting out of the main arm 13' caused by the cam roller 40. In the case shown, the magnetic coupling consists of a magnet 42 arranged in the secondary arm and a screw 43 in the main arm used as a counter pole. Instead of a magnetic coupling, a spring or the like can also be provided, which is seated between the two arms.

The invention claimed is:

1. A gripper for holding a neck region of a preform or a container, the gripper comprising a gripper base on which two gripper arms are pivotably arranged, wherein:
    each of the two gripper arms has a gripping end for partially enclosing the neck region of the preform or the container;
    the two gripper arms are held in a base position under spring tension;
    the gripping ends of the two gripper arms are configured to jointly enclose and hold the neck region and, if the gripping ends come into contact with an obstacle, are configured to pivot out of the base position jointly in one direction;
    a first one of the two gripper arms is a main arm and a second one of the two gripper arms is a secondary arm;
    the main arm is clamped via a spring with the gripper base, which pulls the main arm into contact with the secondary arm in the base position;
    the main arm and the secondary arm are each mounted in respective joints;
    the joint of the secondary arm is closer to its gripping end than the joint of the main arm is to its gripping end;
    the main arm and the secondary arm press against one another in a closed position in at least in two regions;

one of the at least two regions is located above the joint of the secondary arm; and a second one of the at least two regions is located below the joint of the secondary arm on a lever of the secondary arm extending downward from the joint of the secondary arm.

2. The gripper according to claim 1, wherein the joint of the secondary arm is offset by an offset angle of at least half of a predetermined deflection angle of the main arm in relation to the joint of the main arm.

3. The gripper according to claim 1, wherein an actuator is provided for opening the main arm.

4. The gripper according to claim 3, wherein the actuator is a cam roller which engages via a lever on the main arm.

5. The gripper according to claim 1, wherein a coupling is provided between the main arm and the secondary arm.

6. The gripper according to claim 5, wherein the coupling is a magnetic coupling.

\* \* \* \* \*